(12) United States Patent
Turnbo

(10) Patent No.: US 9,889,776 B1
(45) Date of Patent: Feb. 13, 2018

(54) EFFECTIVE AND ECONOMICAL CAR SEAT REMINDER SYSTEM AND KIT

(71) Applicant: Christina L. Turnbo, Pearland, TX (US)

(72) Inventor: Christina L. Turnbo, Pearland, TX (US)

( * ) Notice: Subject to any disclaimer, the term of this patent is extended or adjusted under 35 U.S.C. 154(b) by 41 days.

(21) Appl. No.: 14/862,500

(22) Filed: Sep. 23, 2015

(51) Int. Cl.
*B60N 2/28* (2006.01)
*B60Q 9/00* (2006.01)
*G08B 5/02* (2006.01)
*G08B 21/02* (2006.01)

(52) U.S. Cl.
CPC .......... *B60N 2/28* (2013.01); *B60Q 9/00* (2013.01); *G08B 5/02* (2013.01); *G08B 21/02* (2013.01)

(58) Field of Classification Search
CPC .... B60N 2/26; B60N 2/28; B60Q 9/00; B60R 22/48; G08B 5/00; G08B 5/02; G08B 21/00; G08B 21/02
USPC ......... 116/28 R, 200, 306, 307; 40/591, 593; 340/457, 457.1
See application file for complete search history.

(56) References Cited

U.S. PATENT DOCUMENTS

| | | | | |
|---|---|---|---|---|
| 2,248,338 A * | 7/1941 | Castleman | ............... | A45F 5/004 206/38 |
| 3,968,669 A * | 7/1976 | Coleman | ................ | A45C 11/32 24/299 |
| 4,653,422 A * | 3/1987 | Allen | ................. | B60Q 9/001 116/28 R |
| 5,269,392 A * | 12/1993 | Perrotti | .................. | B60R 99/00 180/271 |
| 5,833,165 A * | 11/1998 | Paugh | .................. | A44B 15/005 242/379.2 |
| 5,938,137 A * | 8/1999 | Poulson | .................. | A45F 5/004 242/379.2 |
| 7,230,530 B1 * | 6/2007 | Almquist | ............... | B60N 2/002 180/271 |
| 7,726,736 B1 * | 6/2010 | Grago, Jr. et al. | ....... | B60N 2/28 24/3.2 |
| 7,908,777 B1 * | 3/2011 | Beardsley | ................ | B60N 2/28 40/320 |
| 8,058,983 B1 * | 11/2011 | Davisson et al. | .. | G08B 21/0205 340/10.1 |
| 8,120,499 B2 * | 2/2012 | Ortiz | ........................ | G08B 3/10 340/457.1 |
| 2006/0061201 A1 * | 3/2006 | Skinner | ................... | B60R 22/00 297/468 |
| 2010/0148544 A1 * | 6/2010 | Gunther et al. | ..... | B60N 2/4885 297/216.12 |
| 2011/0241867 A1 * | 10/2011 | Neal | ..................... | B60N 2/002 340/457 |

(Continued)

*Primary Examiner* — R. A. Smith
(74) *Attorney, Agent, or Firm* — Karen B. Tripp

(57) ABSTRACT

Car seat reminder system providing a connection between the parent or child caregiver driver of an automobile and the infant or child in a car seat positioned on a seat behind the driver's seat in the automobile. The connection is provided by a connector, such as a string, cord, rope, cable, chain, thread, ribbon, or lacing material, having two ends, with one end connected to the car seat, and the other end connected to the key or other mechanism for starting or otherwise turning on the vehicle. The connector should be sufficiently long to reach between the car seat when it is in place on a seat behind the driver's seat, and the automobile ignition point where the vehicle is turned on or the ignition is activated.

16 Claims, 3 Drawing Sheets

(56) References Cited

U.S. PATENT DOCUMENTS

| | | | | |
|---|---|---|---|---|
| 2012/0074757 A1* | 3/2012 | Banda | ............... | B60R 22/00 |
| | | | | 297/468 |
| 2013/0082831 A1* | 4/2013 | Byrne | ............... | B60N 2/28 |
| | | | | 340/457 |
| 2013/0106598 A1* | 5/2013 | Silveira | ............ | B60N 2/002 |
| | | | | 340/457.1 |
| 2016/0052475 A1* | 2/2016 | Foster | ............ | G07C 9/00944 |
| | | | | 340/457 |
| 2016/0137123 A1* | 5/2016 | Faini | ............ | B60Q 9/00 |
| | | | | 340/457.1 |
| 2016/0196732 A1* | 7/2016 | Jones et al. | ............ | B60Q 9/00 |
| | | | | 340/686.6 |

* cited by examiner

EFFECTIVE AND ECONOMICAL CAR SEAT REMINDER SYSTEM AND KIT

BACKGROUND OF THE INVENTION

1. Field of the Invention

The present invention relates to the field of car seats, more specifically, to apparatus and methods for reminding automobile drivers of infant passengers in car seats.

2. Description of Relevant Art

Every year, particularly during hot summer months, the news will report the tragic death of an infant or child left in a car seat in the back seat of a vehicle while the parent or caregiver goes about his or her business forgetting the child. The National Highway Traffic Safety Administration and San Francisco State University's Department of Geosciences has reported hundreds of such deaths in the last two decades. Physicians and psychologists have explained that the forgetting adults typically just do not understand their memory system. They recommend the car driver give himself or herself reminders—keep telling themselves out loud to remember the child—and give themselves visual cues such as a diaper bag in the seat next to the driver or a briefcase next to the child. http://www.webmd.com/parenting/features/hot-cars-and-child-death-prevention.

Safety groups have been telling parents and caregivers for years to put something they will need when they reach their destination in the back seat adjacent a child in a car seat to help them remember the child in the car. One suggestion has been that when one doesn't have a laptop, purse, or cellphone, a shoe could be used. http://www.usatoday.com/story/news/nation/2014/07/02/child-deaths-hot-cars-solution/12098917/

A number of patents have issued on various mechanisms and systems for sensing a baby in a car seat and sending out alarms when the baby is left in the car seat. In 2012, the National Highway Traffic Safety Administration published a report, "Reducing the Potential for Heat Stroke to Children in Parked Motor Vehicles: Evaluation of Reminder Technology," advising that reminder and detection devices currently available in the marketplace appear to be unreliable and require too much effort from caregivers for practical operation.

There continues to be a need for an economical and practical system that won't fail to remind a parent or child caregiver a child is in the back seat.

SUMMARY OF THE INVENTION

The present invention provides a reliable and economical system that will remind a parent or child caregiver when driving a vehicle that he or she has a child in a car seat in a seat behind the driver's seat. In one embodiment the system comprises a kit.

The key element of the system of the invention is a connection between the parent or child caregiver driver of the vehicle and the infant or child in the car seat. The connection is provided by a connector, such as a string, cord, rope, cable, chain, thread, ribbon, or lacing material, having two ends, with one end on or otherwise affixed or connected to the car seat, and the other end on, affixed, or otherwise connected to the key, button, remote activator, or other mechanism for starting or otherwise turning on the vehicle. The connector should be sufficiently long to reach between the car seat when it is in place on the back seat or other seat behind the driver's seat of a vehicle, and the vehicle ignition point, that is, the point where the vehicle is turned on or the ignition is activated.

When the vehicle is turned on and off by turning a key in the ignition switch or by pressing a button in the ignition switch, the ignition point is the vehicle ignition switch. When the vehicle is turned on by activating a remote control, the ignition point is that remote control or remote activator. For measurement purposes according to the invention, the connector should be sufficiently long as to reach from the car seat positioned in a seat behind the driver's seat to whatever means or mechanism the driver uses to cut off the car. For example, if the remote control or remote activator is also used to turn off the vehicle, then the connector should be sufficiently long as to reach from a car seat positioned on a seat in the vehicle behind the driver's seat, to that remote control or remote activator in the driver's possession when the driver is driving in the vehicle, whether that device is on the driver's person as in a pocket, or in a purse, bag, case, or other container in the vehicle. For another example, if the remote control or remote activator is used to turn on the vehicle but the ignition switch is used to turn off the vehicle, then the connector should be sufficiently long as to reach from a car seat position on seat in the vehicle behind the driver's seat, to the ignition switch.

In one embodiment, the invention comprises a kit comprising, containing, having, or including, a connector and two connection pieces, one for affixing to the vehicle ignition point and one for affixing to a car seat. In an alternative embodiment, at least the car seat and/or the vehicle ignition point has a connection piece built in for ready connection to a connector of the invention.

BRIEF DESCRIPTION OF THE DRAWINGS

The present invention and its advantages will be better understood by referring to the following detailed description and the attached drawings.

DETAILED DESCRIPTION OF PREFERRED EMBODIMENTS

While the invention will be described in connection with its preferred embodiments, it will be understood that the invention is not limited thereto. To the contrary, it is intended to cover all alternatives, modifications, and equivalents, which may be included within the scope of the invention, as defined by the appended claims.

Figure 1:
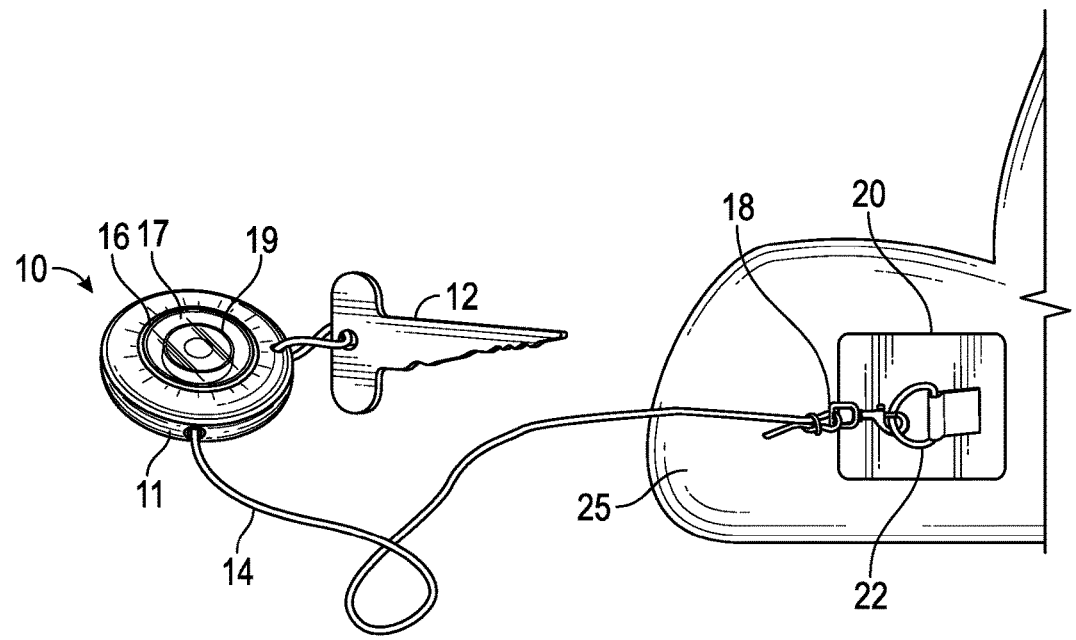
FIG. 1 shows a perspective view of one embodiment of a key ring connection piece of the present invention affixed at one end of a connector cord, which cord is affixed at the other end to a connection piece mounted on a car seat.
Figure 2:
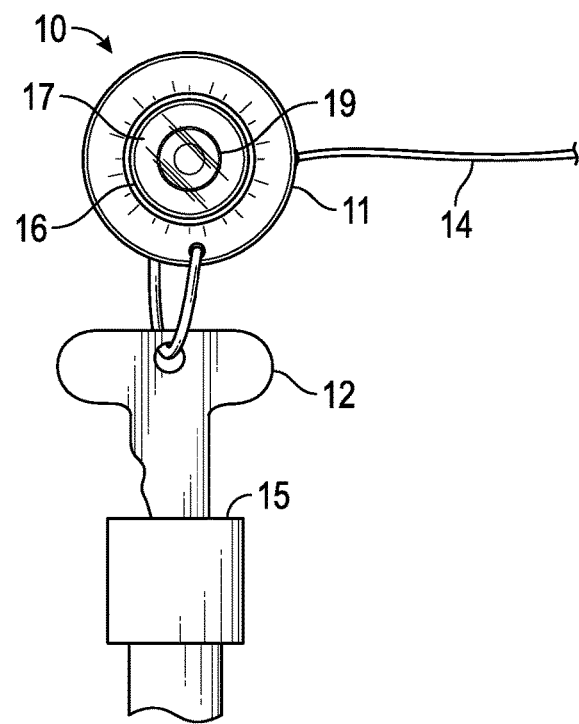
FIG. 2 is a close up top view of the key ring connection piece of FIG. 1 positioned in an automobile ignition switch.

A typical embodiment of the present invention is illustrated in FIGS. 1, 2, 3, and 4. Referring to the Figures, a first connection piece 10 serves as a key holder or key ring for the ignition key 12 of an automobile or other vehicle. The exact shape and appearance of connection piece 10 may vary widely but preferably is a size and comprised of a material that is typical for key rings and key fobs so as to fit conveniently in a person's pocket or purse. For example, suitable materials for connection piece 10 include without limitation, hard plastic, soft plastic, acrylic, ABS material, soft metal, hard metal, foam material, and zinc alloy material. One example first connection piece 10 may look like a yo yo with connector 14 coiled or wound between two protective discs 13 providing a housing for the connector 14. Another example may have the connector 14 entirely covered within the housing 11 (when not extended at least partially out of the housing) so the connection piece 10 looks like a small disc, as shown in FIGS. 1 and 2, or a ball about the size of a ping-pong ball. Another example may be irregular in shape but have a housing for a connector 14 and a mechanism such as a pushbutton 16 for example for retracting the connector 14, similar to a typical retractable cable lock for a bicycle or for mountain climbing, a retractable lanyard or badge reel, or a miniature dog leash.

Connector 14 is comprised of any material that may be easily wound and unwound such as for example a string, cord, rope, cable, chain, thread, ribbon, or lacing material and that is light in weight and is preferably also inexpensive. As used herein, the term "light in weight" refers to an amount of weight that a person would consider "light" or insignificant, or not burdensome, such as for example less than a pound in one embodiment and less than 8 ounces in an alternative embodiment. Connector 14 is preferably durable and able to withstand multiple rewindings and unwindings without breaking. Typical suitable materials for a cord comprising the connector 14 include for example, without limitation, bungee type cord, KEVLAR® cord available from E. I. Du Pont de Nemours and Company, cloth cord, polyester cord, braided cord, and rayon cord. Typical suitable materials for lacing material comprising the connector 14 include for example, without limitation, shoelaces, leather, cotton, jute, hemp, and other natural and synthetic materials commonly used in the manufacture of rope.

Connector 14 has two ends, with the end proximal the first connection piece 10 permanently or not removably connected to that connection piece 10. In one embodiment, the end of connector 14 distal the connection piece 10 is simply the raw or finished natural end of the connector 14 material, such as string, cord, rope, cable, thread, ribbon, or lacing material, as such end might be cut in making the connector 14 a certain length for use. In use according to the invention, such distal end of connector 14 is tied or knotted to second connection piece 20. In an alternative embodiment, the end of connector 14 that is distal connection piece 10 comprises or is attached to a clasp 18 or other holder, fastener or grabber for easier attachment and detachment of connector 14 to second connection piece 20 than might be obtained by simply tying or knotting and untying and unknotting that distal end of connector 14 to the second connection piece 20. In one embodiment, connector 14 has the ability to break away, that is, break connection, when over a certain or predetermined amount of pressure is applied, such as, for example, 25 pounds of pressure, as a safety feature.

As shown in the Figures, connection piece 10 comprises a housing 11, which contains therein or therewith a connector 14 of sufficient length to extend from the ignition point of the automobile to the rear seat of the automobile. The connector 14 is most preferably retractable and button 16 is used to engage a retracting mechanism within the housing 11 to retract and rewind the connector 14 to position it essentially entirely within the housing 11, for storage when not in use. Any typical mechanism for retracting a cord may be used. For example, such mechanism may work like that of a typical retractable cable lock for a bicycle, for mountain climbing, or a dog leash. That is, for example, in one embodiment, such retracting mechanism comprises a spool assembly rotatably mounted in the housing and adapted for winding and unwinding connector 14 as by connection to a spring. A movable trigger enables the connector 14 to extend out of the housing in response to an external force, such as simply pulling of the connector 14. The spooling assembly is spring biased to cause the cord to retract in the absence of the presence of an external force. That is, the spring is biased to turn the spool so the cord is wrapped around it. Optionally, a latch mechanism or a dual-position switch operates in a first position to lock the cord in a certain extended position and in a second position to enable the release of the latch so the cord can extend and retract freely.

In one embodiment, the connection piece 10 has at least one LED or other light source 17 so that the piece lights up and preferably flashes when the connection piece 10 is activated. In one embodiment, connection piece 10 is activated by pulling the connector 14 partially out of the housing 11 an amount beyond a de minimus amount or at least about twelve inches or more. In another embodiment, connection piece 10 is activated by the tautness and pulling against the cord caused by turning the key 12 in the automobile ignition switch 15 after pulling the connector 14 out of the housing 11 an amount sufficient for the connector 14 to reach from the back seat of the automobile to the ignition switch of the automobile. In these examples, the LED switch is associated with the pull on the connector 14, or with the spring or latch mechanism (associated with button 16 in FIG. 1) for retracting the connector 14 to effect the result of the LED or other light source 17 being turned on when the connector 14 is in use according to the system of the invention. The LED or other light source 17 may be powered by a small battery 19 such as the size battery that is typically used for a watch.

In an alternative embodiment, instead of, or in addition to, holding a key 12, the first connection piece 10 has a receiver for an ignition switch activation button, so that the connection piece may receive the button or otherwise affix to or directly associate with the ignition switch so that the connection piece 10 is used to activate the ignition switch.

In still another alternative embodiment, the first connection piece 10 is attachable or affixable to a remote ignition switch activator. Is such embodiment, the attachment to the switch activator activates the connection piece or use of the switch activator to start the automobile activates the connection piece.

As indicated above, the first connection piece 10, when activated, may shine with at least one LED light 17 which may preferably blink, to attract the attention of the vehicle driver, reminding the driver that a baby or child is in a car seat positioned on a seat behind the driver's seat. Alternatively, or additionally, the first connection piece may contain a computer chip, memory chip or music chip, so that when activated, the connection piece plays music, information, or a message.

It is not necessary, however, to activate the first connection piece 10 so that it shines or flashes one or more lights and/or plays music, to accomplish its key role in the invention. That is, the key role of the first connection piece 10 is to serve as a connection with the driver of the vehicle through the connector 14 to the infant or child in the car seat via second connection piece 20. First connection piece 10 has the attention of the driver of the vehicle because of the association or connection of the first connection piece 10 with the vehicle ignition switch or vehicle ignition switch activator. Connector 14 takes that attention of the vehicle driver from first connection piece 10 to second connection piece 20 which is in association or connection with the car seat 25 to remind the vehicle driver of the baby or child in the car seat 25.

Figure 3:
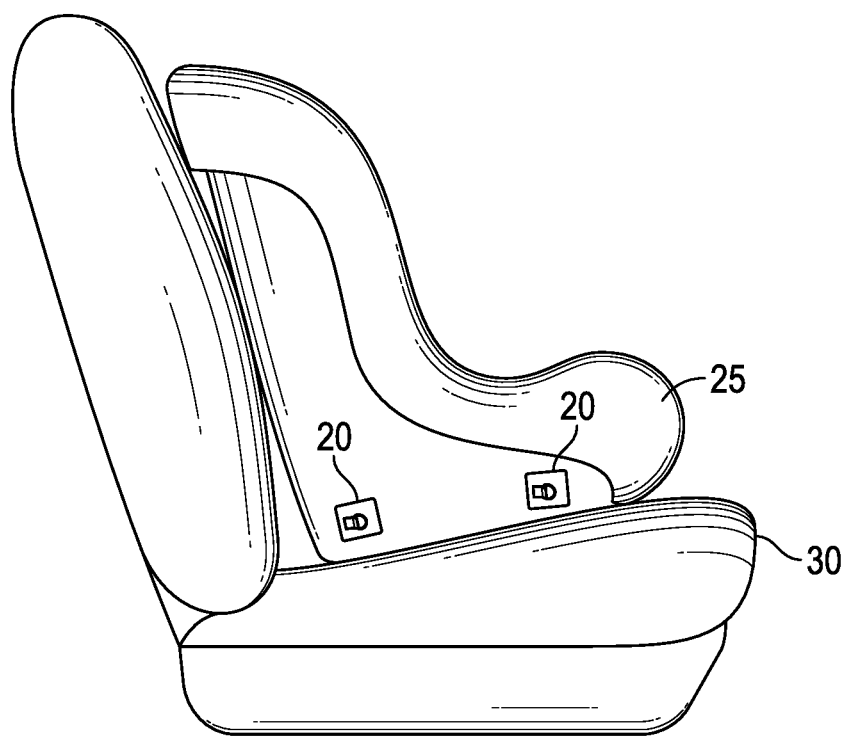
FIG. 3 is a side view of a car seat positioned on an automobile seat showing connection pieces of one embodiment of the invention mounted on the car seat.
Figure 4:
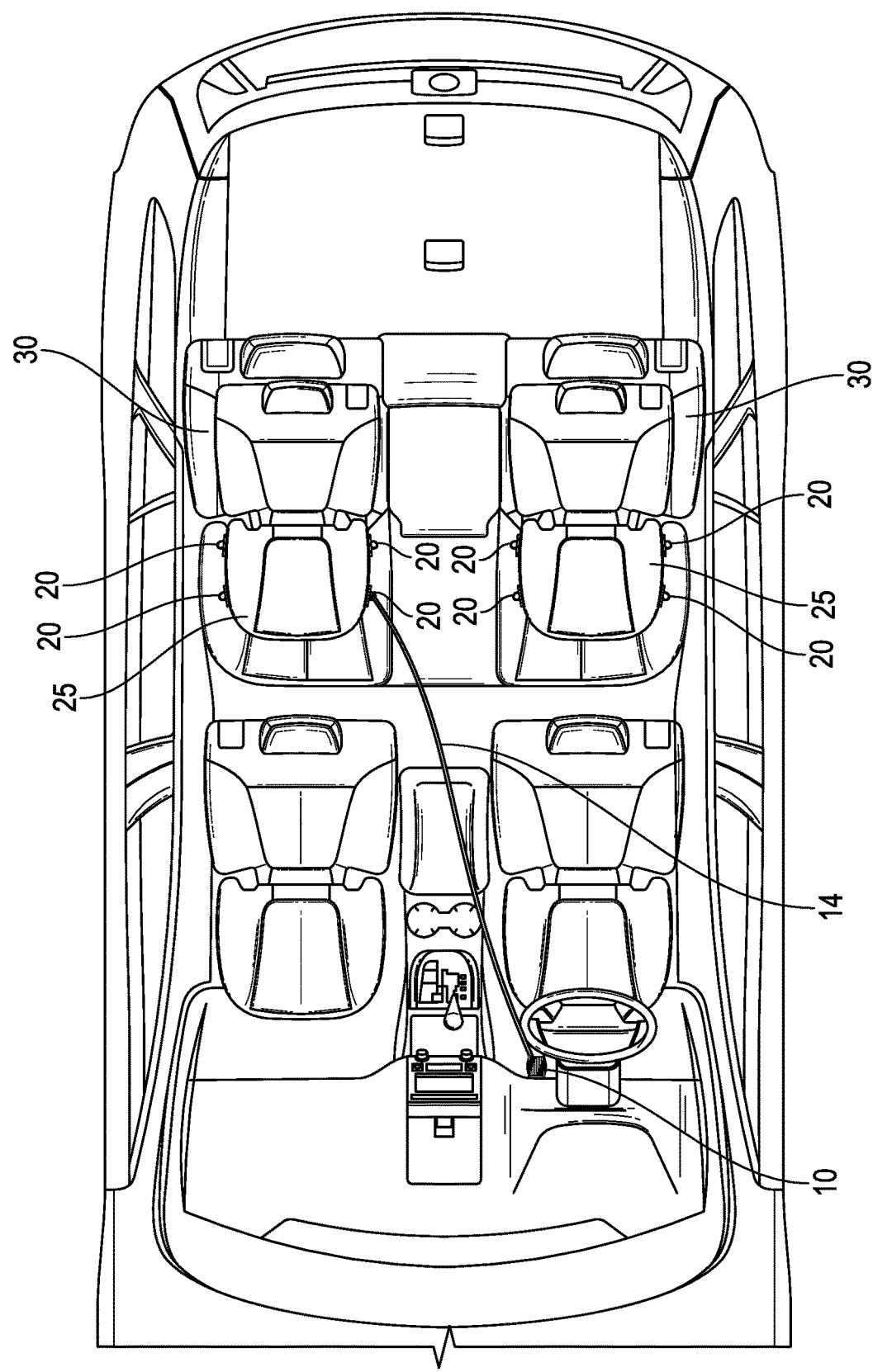
FIG. 4 is a top view of the interior of a car showing one embodiment of the system of the invention in place inside the car.

Second connection piece 20 comprises a hook, hanger, or other curved piece 22 for receiving a clasp 18 or other fastener, clip, holder or grabber at the distal end of connector 14, or for tying or knotting a natural or finished raw end of connector 14, so as to effect a connection between connector 14 and the second connection piece 20. Hook 22 is comprised of metal, plastic or fabric. Second connection piece 20 is similarly comprised of metal, plastic or fabric and has a means for affixing connection piece 20 to the car seat 25. In one embodiment, second connection piece 20 is glued, stapled, screwed, or sewn to the car seat. In another embodiment, connection piece 20 is built into the car seat 25, as for example, via molding or injection molding with the manufacture of the car seat, and in such embodiment, hook 22 and connection piece 20 may be merged together as part of the car seat 25. That is, the hook 22 may become part of the car seat without need for a separate connection piece 20 to hold the hook 22 on the car seat 25. Second connection piece 20 and with it hook 22 are positioned on the car seat 25 at a location that is preferably out of the way and unreachable by a child or infant in the car seat, while also preferably being conveniently reachable to the parent or child care giver and vehicle driver who positions the infant or child in the car seat. One such example location is shown in FIGS. 1, 3, and 4, namely on the side of the car seat 25 near the vehicle seat 30 on which the car seat 25 is resting. More than one second connection piece 20 may be positioned on the car seat 25 at different locations as shown for example in FIG. 3 and FIG. 4 for convenience of use, although only one second connection piece 20 is used with connector 14 at a time. Rear facing car seats may have a second connection piece 20 positioned on the back of the car seat.

FIG. 4 shows two car seats 25 in place in the back seat 30 of an automobile to indicate that the car seat 25 may be positioned at any location in the back seat 30 for use according to the present invention. The system of the invention is illustrated with one of the two car seats for example, showing the connection between first connection piece 10 and second connection piece 20 through connector 14.

In one embodiment of the invention, respective first and second connection pieces 10 and 20 and connector 14 are available in a kit to adapt existing car seats for use with the system of the invention. Second connection piece 20 will typically have a glue or adhesive strip on the back for sticking to the car seat. Alternatively or additionally, in one embodiment, the kit could comprise a non destructive adhesive such as for non-limiting example ceramic adhesive sealant, IQ glue, metal bonding material, epoxy, strong epoxy, rapid steel adhesive glue for use instead of a glue or adhesive strip for attaching the second connection piece 20 to a car seat 25. In still another embodiment, the kit could comprise screws for attaching the second connection piece 20 to a car seat. First connection piece 10 will be adaptable for receiving an automobile key and/or automobile ignition switch button or other ignition switch activator and/or for otherwise associating with and connecting to a remote activator for an automobile ignition switch.

Although the description above contains many specifications, these should not be construed as limiting the scope of the invention but as merely providing illustrations of some of the presently preferred embodiments of this present invention. Persons skilled in the art will understand that the method and apparatus described herein may be practiced, including but not limited to, the embodiments described. Further, it should be understood that the invention is not to be unduly limited to the foregoing which has been set forth for illustrative purposes. Various modifications and alternatives will be apparent to those skilled in the art without departing from the true scope of the invention, as defined in the following claims. While there has been illustrated and described particular embodiments of the present invention, it will be appreciated that numerous changes and modifications will occur to those skilled in the art, and it is intended in the appended claims to cover those changes and modifications which fall within the true spirit and scope of the present invention.

Thus, the scope of the invention should be determined by the appended claims and their legal equivalents, rather than by the examples given.

I claim:

1. A system for reminding a vehicle driver of a child in a car seat behind the driver, the system comprising a physical connection between the car seat and a vehicle ignition point,
   wherein the vehicle ignition point is an ignition switch;
   wherein the connection to the vehicle ignition point is through a connector key holder holding a key positioned in the ignition switch;
   wherein the connector key holder comprises a mechanism for receiving and releasing a connector attachable or connectible to the car seat; and
   wherein the key holder comprises a light source which is activated when the physical connection between the car seat and the vehicle ignition point is made.

2. The system of claim 1 wherein the physical connection is provided by a connector extending between the car seat and the vehicle ignition point, wherein the connector comprises a string, rope, cord, cable, chain, thread, ribbon, or lacing material, having two ends, with one end connected to the car seat and one end connected to the vehicle ignition point.

3. The system of claim 2 wherein the connection to the car seat is provided by a hook attached to the car seat and to which the connector attaches.

4. The system of claim 3 wherein the hook is built into or molded in the car seat.

5. The system of claim 3 wherein the hook is affixed to a plate which is attached to the car seat.

6. The system of claim 5 wherein the plate is attached to the car seat with adhesive.

7. The system of claim 5 wherein the plate is attached to the car seat with screws.

8. The system of claim 1 wherein the light source comprises one or more LEDs.

9. The system of claim 1 wherein the light blinks when activated.

10. A system for reminding a vehicle driver of a child in a car seat behind the driver, the system comprising a physical connection between the car seat and a vehicle ignition point,
    wherein the vehicle ignition point is an ignition switch;
    wherein the connection to the vehicle ignition point is through a connector key holder holding a key positioned in the ignition switch;
    wherein the connector key holder comprises a mechanism for receiving and
    releasing a connector attachable or connectable to the car seat; and wherein the key holder comprises a music or auditory chip, or computer chip, for playing music or providing information when activated by the physical connection being made between the car seat and the vehicle ignition point.

11. The system of claim 10 wherein the physical connection is provided by a connector extending between the car seat and the vehicle ignition point, wherein the connector comprises a string, rope, cord, cable, chain, thread, ribbon, or lacing material, having two ends, with one end connected to the car seat and one end connected to the vehicle ignition point.

12. The system of claim 11 wherein the connection to the car seat is provided by a hook attached to the car seat and to which the connector attaches.

13. The system of claim 12 wherein the hook is built into or molded in the car seat.

14. The system of claim 12 wherein the hook is affixed to a plate which is attached to the car seat.

15. The system of claim 14 wherein the plate is attached to the car seat with adhesive.

16. The system of claim 14 wherein the plate is attached to the car seat with screws.

\* \* \* \* \*